United States Patent
Brew et al.

(10) Patent No.: US 10,685,043 B2
(45) Date of Patent: Jun. 16, 2020

(54) EVENT ANALYSIS IN NETWORK MANAGEMENT EVENT STREAMS

(71) Applicant: International Business Machines Corporation, Armonk, NY (US)

(72) Inventors: Anthony T. Brew, Dublin (IE); John D. Postoyko, Hemel Hempstead (GB); Jonathan I. Settle, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 14/936,714

(22) Filed: Nov. 10, 2015

(65) Prior Publication Data

US 2017/0132306 A1    May 11, 2017

(51) Int. Cl.
    *G06F 16/28*     (2019.01)
    *G06F 16/2455*   (2019.01)
    *G06F 16/2457*   (2019.01)
    *G06F 16/23*     (2019.01)

(52) U.S. Cl.
    CPC ........ *G06F 16/285* (2019.01); *G06F 16/2358* (2019.01); *G06F 16/24568* (2019.01); *G06F 16/24578* (2019.01)

(58) Field of Classification Search
    None
    See application file for complete search history.

(56) References Cited

U.S. PATENT DOCUMENTS

| | | |
|---|---|---|
| 8,484,514 B2 | 7/2013 | Tonouchi |
| 9,021,304 B2 | 4/2015 | Tonouchi |
| 9,747,316 B2 | 8/2017 | Baum et al. |
| 2008/0010047 A1 | 1/2008 | Graf et al. |
| 2010/0100775 A1 | 4/2010 | Slutsman et al. |
| 2015/0058449 A1 | 2/2015 | Garg et al. |
| 2016/0179598 A1 | 6/2016 | Lvin et al. |
| 2017/0063907 A1* | 3/2017 | Muddu ............... H04L 63/1425 |
| 2017/0116064 A1 | 4/2017 | Nano et al. |

OTHER PUBLICATIONS

Berberidis et al., "Inter-Transaction Association Rules Mining for Rare Events Prediction," Department of Informatics, Aristotle University of Thessaloniki, Thessaloniki, Greece, 10 pages.

(Continued)

*Primary Examiner* — Amresh Singh
(74) *Attorney, Agent, or Firm* — Jamar K. Ray

(57) ABSTRACT

A plurality of first event instances of a first event and a plurality of second event instances of a second event are received based on the first event occurring and the second event occurring. Each event instance has an event identifier and a timestamp. A first event type of the plurality of first event instances and a second event type of the plurality of second event instances are identified. A time period of overlap between the first event and the second event are determined by detecting regular intervals between the plurality of first event instances, as compared to each other, and the plurality of second event instances, as compared to each other. A relationship between the first event and the second event are scored based on the time period of overlap. The first event and the second event are grouped based on the scored relationship.

17 Claims, 8 Drawing Sheets

(56) References Cited

OTHER PUBLICATIONS

Cule et al., "MARBLES: Mining Association Rules Buried in Long Event Sequences," Department of Mathematics and Computer Science, University of Antwerp, 12 pages.

Schiefer et al., "Correlating Business Events for Event-Triggered Rules," G. Govematori, J. Hall, and A. Paschke (Eds.): RuleML 2009, LNCS 5858, pp. 67-81, Copyright Springer-Verlag Berlin Heidelberg 2009.

Vilalta et al., "Predicting Rare Events in Temporal Domains," Proceedings of the 2002 IEEE International Conference on Data Mining, pp. 474-481, Copyright 2002 IEEE DOI: 10.1109/ICDM.2002.1183991.

Mell et al., "The NIST Definition of Cloud Computing," National Institute of Standards and Technology, U.S. Department of Commerce, Special Publication 800-145, Sep. 2011, 7 pages.

\* cited by examiner

EVENT ANALYSIS IN NETWORK MANAGEMENT EVENT STREAMS

BACKGROUND

The present invention relates to event analysis, and more specifically, to event analysis in network management event streams. Data center and network management disciplines have focused extensively on fault and root cause analysis process, tools, and best practices. When events occur in a data center, a notification may be sent to an event manager or fault management system. The event may be a crashed database or a malfunctioning application. The event may be de-duplicated, correlated, and enriched. It may be handled via a policy enforced by a rules engine and it may be used to automatically create a ticket for a help desk.

Events and tickets can be considered the "backbone" of fault management. For providers of large telecommunication networks in particular, the scale of the number of events has increased rapidly. This is a consequence of the growth in customer numbers, increased average level of usage per customer, and consolidation through mergers to form larger telecommunication companies. There is also increased diversity of events due to an expanding variety of devices that are monitored as new technologies are adopted.

SUMMARY

Embodiments of the disclosure provide a computer-implemented method, system, and computer program product for event management. The method can receive, based on a first event occurring and a second event occurring, a plurality of first event instances of the first event and a plurality of second event instances of the second event. Each event instance can have an event identifier and a timestamp. The method, system, and computer program product can further identify, in response to the receiving, a first event type of the plurality of first event instances and a second event type of the plurality of second event instances. The method, system, and computer program product can further determine, by detecting regular intervals between the plurality of first event instances, as compared to each other, and the plurality of second event instances, as compared to each other, a time period of overlap between the first event and the second event. The method, system, and computer program product can further score, based on the time period of overlap, a relationship between the first event and the second event. The method, system, and computer program product can further group, based on the scored relationship, the first event and the second event.

Embodiments of the disclosure provide a computer-implemented system for event management. The system can include a processor and a memory configured to provide computer program instructions to the processor to execute functions of defined components. The system can further include a history of event instances with each event instance having an event identifier and a timestamp. The system can further include an event type component for identifying event identifiers that are state event types by detecting regular intervals of event instances with an event identifier in the history. The system can further include a time overlap component for scoring a relationship between the two event identifiers based on a time period of overlap of the event instances belonging to the two event identifiers between two event identifiers that are identified as state event types. The system can further include a first occurrence component for scoring a relationship between the two event identifiers based on a first occurrence of an event instance of each of the two event identifiers between two event identifiers that are not both identified as state event types. The system can further include an event instance grouping component for using the relationship scores between two event identifiers to group event instances.

Embodiments of the disclosure provide a computer program product for event management. The computer program product can include a computer readable storage medium having program instructions embodied therewith, the program instructions can be executable by a processor to cause the processor to provide a history of event instances with each event instance having an event identifier and a timestamp. The program instructions can further cause the processor to identify event identifiers that are state event types by detecting regular intervals of event instances with an event identifier in the history. The program instructions can further cause the processor to score a relationship between the two event identifiers based on a time period of overlap of the event instances belonging to the two event identifiers between two event identifiers that are identified as state event types. The program instructions can further cause the processor to score a relationship between the two event identifiers based on a first occurrence of an event instance of each of the two event identifiers between two event identifiers that are not both identified as state event types. The program instructions can further cause the processor to use the relationship scores between the two event identifiers to group event instances.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
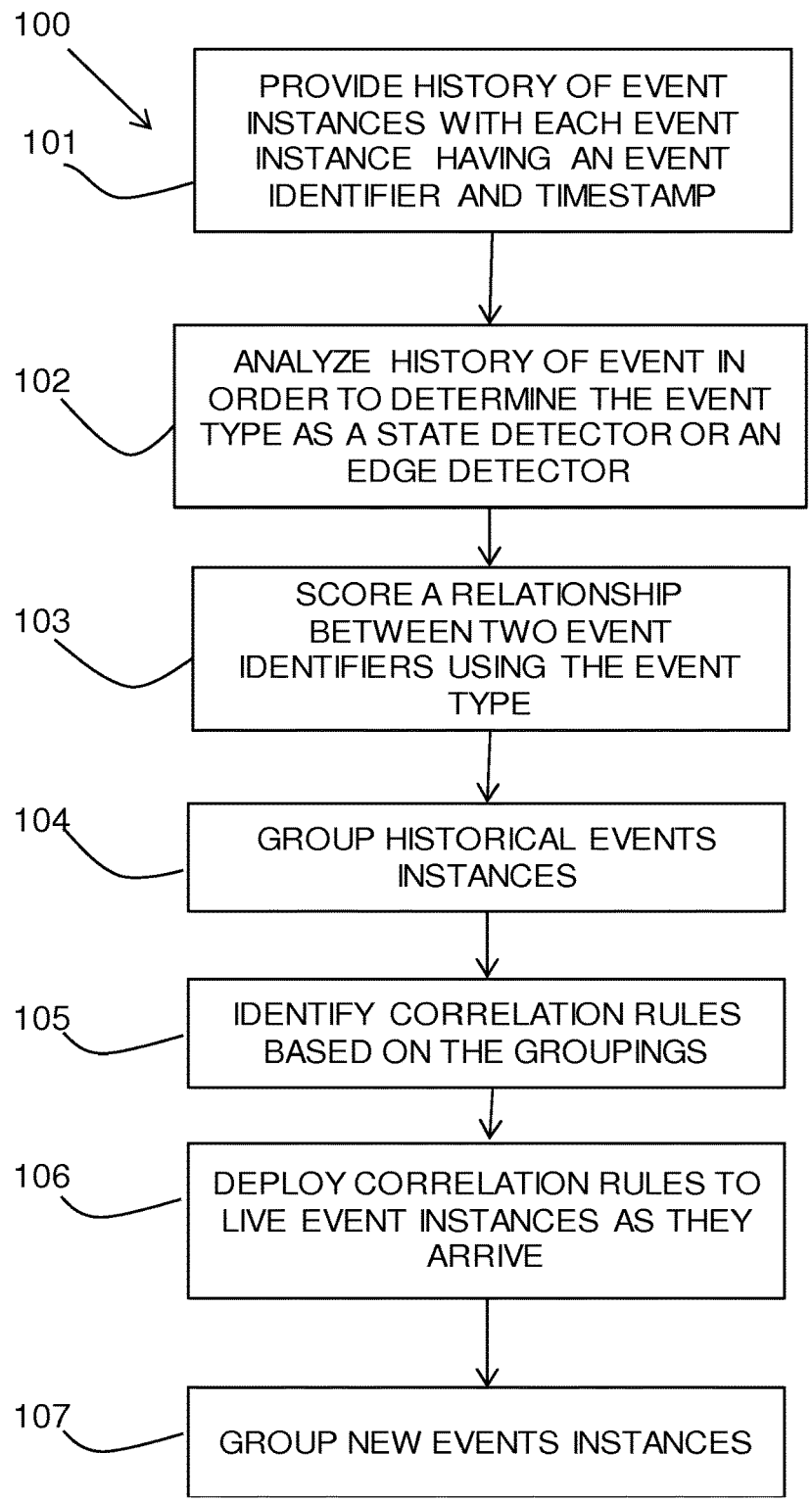
FIG. 1 depicts a flowchart for a method for grouping new event instances, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data center and network management, more particular aspects relate to managed entities and resources in a managed environment. While the present disclosure is not necessarily limited to such applications, various aspects of the disclosure may be appreciated through a discussion of various examples using this context.

In event managers, there may be a high value in the deployment of grouping mechanism's to find recurrent patterns in the event stream so that when operators have been presented with a set of incoming events the list is compacted and condensed as much as possible by applying already observed relations.

Data center and network management can use fault management systems to analyze events generated by managed entities and resources in a managed environment. Events can be a customer request for technical support due to a technical error. The technical error can be, but is not limited to a logon error on a company's website or another type of error on a company's website. Events are logged with event instances with fields including information regarding the event instance such as a timestamp, an alert group, an alert key, a node, a summary, an identifier, and other configured information. Multiple event instances with different timestamps may belong to an event identifier that may be known by an identifier attribute or a combination of other attributes.

An event management system can analyze one or more events in order to identify groups of events that occur together. The events can be grouped together according to type of technical error, or other similarities within their fields. A relationship between grouped events can be exploited in order to reduce the likelihood that resources are wasted. For example, when two or more groups have a substantially similar technical error, e.g. a logon error, the errors can be addressed simultaneously rather than separately. The event management system can analyze archived historical events and create a related events configuration that can identify and group related events from the archived historical events and derive correlation rules. The correlation rules may be monitored by, e.g. a resource manager, for effectiveness. Policies may be created from analyzing deployed correlation rules. The policies may then take advantage of real time events in order to group events for presentation of a reduced number of events to an operator. For example, the operator could handle the two or more logon errors simultaneously.

Grouping events may reveal relationships between event instances and between managed entities. For example, a resource manager that manages one entity could have a recurring error that is substantially similar to a second resource manager that manages a second entity. By identifying the relationship, the two errors could be solved simultaneously. A single failure in a managed environment can lead to multiple events being received as the impact of the failure propagates through the environment. This can lead to resources being wasted on one or more errors being managed individually. Inefficiencies can arise when multiple operators are working on different events that stem from the same problem. Grouping the events can reduce the multiple operators' workloads.

The event management system can include a related event analytic capability which learns relationships between events based on historical event data. The historical event data can be presented as a set of groups which can be developed into correlation rules. The correlation rules can be a set of rules that could be intelligently formulated by a resource manager. The correlation rules could be known mathematical techniques that could improve resource management and can also include intelligent grouping of similar events applied to the relationships. The described method and system can determine a type of event and generate relationship scores using different methods depending on the event types. The described method and system can further leverage domain knowledge about the event types to enable faster grouping on historic event archives with less co-occurrences required and without additional configuration.

Event generators can fall into two main categories, "Edge Detectors" which announce the beginning of a failure (for example, a system shutdown) and "State Detectors" which report their error state for the duration of the issue. It may not be known a priori to the event management system what type of detector is emitting the event and so, unless a configuration that determines the event generator is put in place, it may remain unknown.

The described method and system can use an ability to join a discovery of events that are state detectors with events that are edge detectors in order to enhance rule mining mechanisms found within event management systems. This can enable fast tracking of the discovery of relations between events in a case where there is an awareness of two state detecting event sources, whilst enabling the continual provision of relations that are already discovered.

Referring to FIG. 1, a flowchart of a method 100 for grouping new event instances can be seen, according to embodiments of present disclosure. In embodiments, the method 100 can rely on analyzing a history of event instances in operation 101. The history of event instances includes one or more event instances. Each of the event instances can include an event identifier (which acts as a primary key) and a timestamp. The same event identifier may re-occur multiple times across the data set. Each event identifier may come from a different type that may be determined by what type of generator created it and the type of probe that collects or triggers these events. Information about what type of probe generated the event instances is available or can be deduced from the event instances. Probes connect to an event source, detect and acquire event data, and forward the data as events. Events enter an event management system via a variety of mechanisms including, but not limited to probes, gateways, and application programmatic interfaces (APIs). In embodiments, once the history of events is provided in operation 101, the method can proceed to an operation 102.

In embodiments, in operation 102, the history of event instances can be analyzed in order to determine that the event type is either a state detector or an edge detector. This can be achieved by determining what type of probe an event emanates from in order to categorize an event identifier with an event type. This can be a many-to-one relationship, since many different event identifiers may have the same event type.

As an example, "database fail on host A" may be considered to be the event identifier. This event can happen three times, on Monday, Tuesday and Friday in a given week. The type of event instance can be "Database Fails", which is a type that may be shared by multiple identifiers. The event type can either be an Edge Detector or a State Detector for all the identifiers. It should be noted that the term "type" is used for the types of probe, for example, a shut-down hook, or a threshold breach, as well as for the Edge Detector or State Detector event types.

In embodiments, in operation 103, using an event type categorization, a relationship between two event identifiers may be scored. This relationship can be based on the event type probe. This relationship can also be based on the event type detector, e.g., the duration of the event type. For example, a time of an event can be inferred from identifying an edge detector for a given event followed by four state detectors. The relationship can also be determined by using different techniques depending on the event types of the two event identifiers. In embodiments, the method 100 can proceed to an operation 104, once a relationship between event identifiers has been scored in operation 103.

In embodiments, in operation 104, events can be grouped based on the scored relationships. In operation 105, the groupings may be used in order to create and identify correlation rules. Correlation rules can be used in order to identify rules more quickly in the historic event archive. Correlation rules can be used so that the events are organized more efficiently and their organization is not be based on mere coincidence. Correlation rules may be generated when a relationship strength is above a given threshold. A pair of event identifiers may have a relationship strength of some value, and a threshold may be set above which a relationship strength is required to score for there to be a correlation between the event identifiers. All relationships that exceed the threshold can be forwarded to make groups of events. These correlation rules may then be deployed, in operation 106, in a live system of event management. This deployment of correlation rules to live events can affect the efficiency of solving events. In embodiments, in operation 107, the live events can be grouped according to the correlation rules as they arrive to the system. This can be beneficial for reducing the workload on an operations center for handling events. In embodiments, once operation 107 groups the live events according to correlation rules, the method 100 can conclude.

Figure 2:
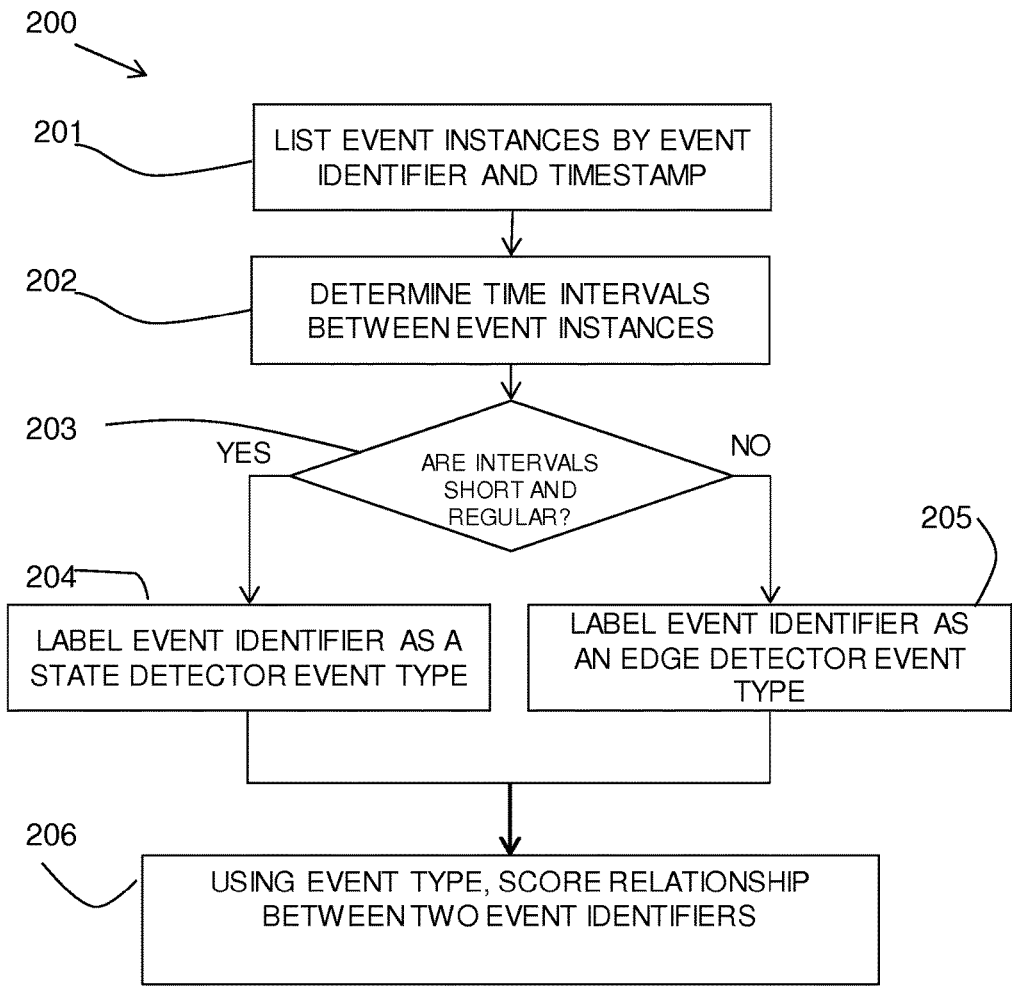
FIG. 2 depicts a flowchart for a method of determining a type of received event, according to various embodiments.

Referring to FIG. 2, a flowchart of a method 200 depicts a more detailed example of the method 100, according to embodiments of the present disclosure. In operation 201, a list of event instances can be retrieved. Each event instance can include an event identifier and a timestamp. The event instances can be identified by probes, such as APIs. The event instances can be failed operations within a remote computing system or a computing system. In embodiments, once the operation 201 has retrieved the list of event instance, the method 200 can proceed to an operation 202.

In embodiments, operation 202, can include determining time intervals between event instances. In embodiments, the time intervals can be inferred by analyzing the timestamps of the event instances for one event identifier. The time intervals can be the length of time between two events occurring. The time stamps can also be analyzed for more than one time stamp to determine a relation and frequency between event instances. For example, when a first event always occurs five seconds before a second event it could be inferred that there is a relationship between the first and second event. Once operation 202 has determined the time intervals between events, the method can proceed to an operation 203.

In decision block 203, the time intervals can be analyzed to determine when the intervals are short and when the intervals are regular. Intervals that are short can mean that the frequency between a single event can be quick relative to other events. Regular intervals can mean that a single event occurs frequently. These time intervals may be in the order of minutes and possibly as low as in the order of microseconds. Once the operation 203 determines that the intervals are short and when they are regular, the method 200 can proceed to an operation 204. In embodiments, operation 204 can include categorizing the event identifier as a "State Detector" event type. Once the operation 203 determines that the intervals are not short and when they are regular, the method 200 can proceed to an operation 205. When the operation 203 determines that the time intervals of event instances are not short and regular, the event identifier may be categorized and labeled in operation 205 as an "Edge Detector" event type. Once the event identifier has been labeled then categorized as either a State Detector or an Edge Detector, the method 200 can proceed to an operation 206.

In embodiments, in operation 206, the method 200 learns events that are related to one another by scoring relationships between two event identifiers based on their event type as determined in operation 203. The event identifiers are stored and retrieved from history. In embodiments, in operation 206 outcomes to scoring can be based on what type of detector the identifier has been labeled and categorized as, e.g., state or edge detector.

This relationship may be according to three different forms in embodiments. A first form can be between event identifiers that are both "Edge Detectors" in which case a "First Occurrence" technique is used to score the relationship as described further below and as known from conventional event management systems. A second form can be between event identifiers that are mixed with one "Edge Detector" and one "State Detector" in which case a "First Occurrence" technique is also used. The third form can be between event identifiers that are both "State Detectors" which use a scoring technique that takes into account issue overlap time according to the described method. This can be enabled by operation 203, which can identify the event type.

The above operations can allow groupings of events to be discovered that enable deployment to a live event management interface so that further live events can be grouped based on the linkages learnt in the above steps by the correlation rules. Based on historic data, events are learnt that are related by a correlation to one another between events that are both "Edge detectors" and between events that are mixed use ("Edge Detector and State Detector") using a "First Occurrence" technique.

A first occurrence means that there is a first occurrence from one or both of the event types since at least one can be labeled as an "Edge Detector". In a first occurrence, relations between each pair of event identities are learnt if a pair of first occurrences from each event appear within a given window and there is an increment to a co-occurrence count by one. Relations for a first occurrence can also be learnt across all time that the events have occurred. Further, relations for a first occurrence can measure the strength of the relationship between two event identities (A and B) with a metric such as, count co-occurrences of A and B/Max (count occurrences of A plus count occurrences of B). Even further, the relation could be a first occurrence when the measure exceeds a threshold between the two events. A second occurrence could occur when both of the events are labeled as a state detector.

Figure 3:
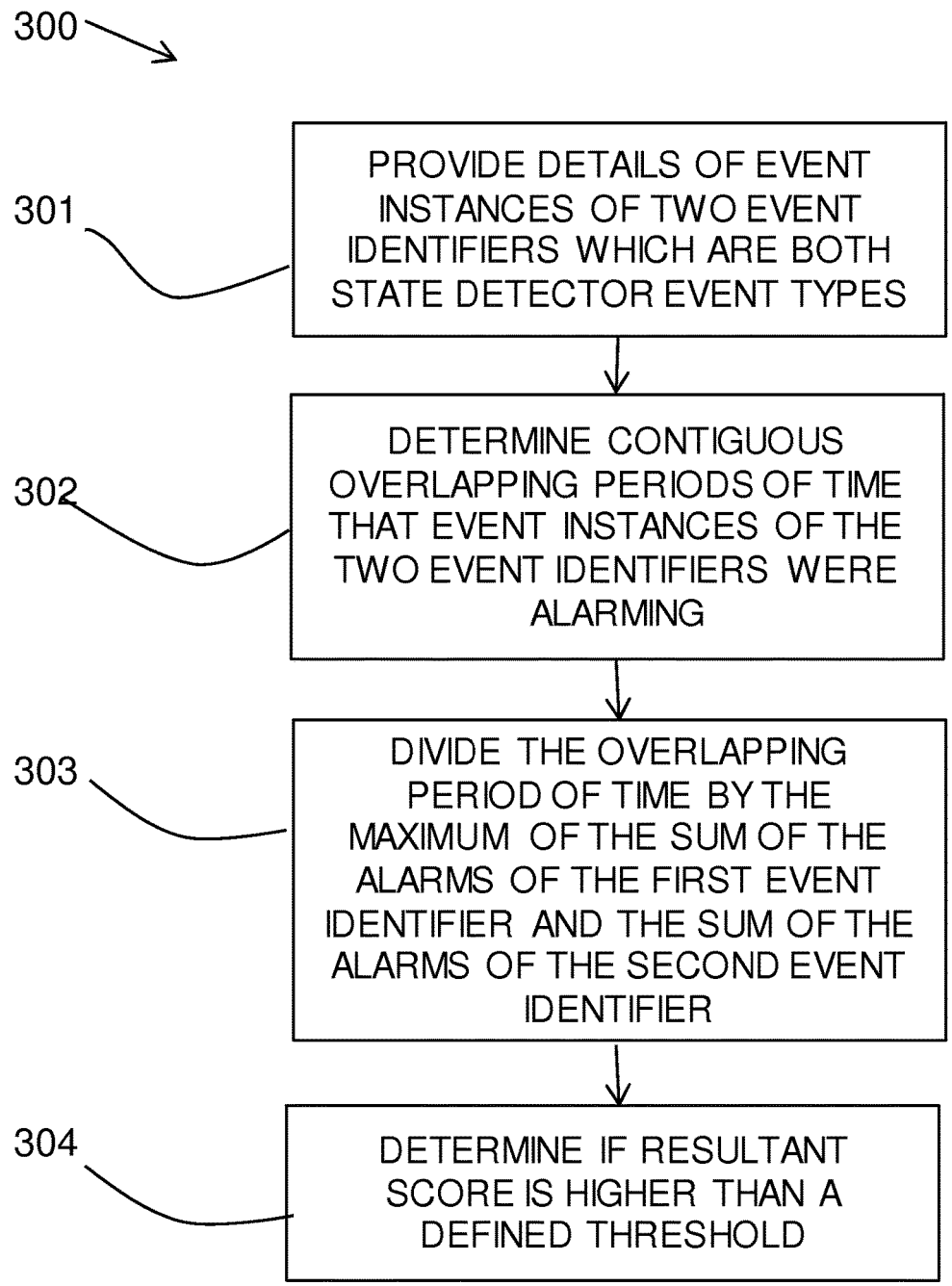
FIG. 3 depicts a flowchart for a method of determining an amount of overlap between two received event instances, according to various embodiments.

In embodiments, referring to FIG. 3, a flowchart for a method 300 of scoring a relationship between event identifiers, both of which can be "State Detector" event types, is illustrated, according to various embodiments. In embodiments, in operation 301 details of event instances of two event identifiers are provided and retrieved. In embodiments, the two event identifiers can be labeled as state detector event types. The details can be retrieved from the history archives of event instances. In embodiments, once operation 301 retrieves and provides the details of the state detector event types, the method 300 can proceed to an operation 302.

In embodiments, operation 302 can include determining the contiguous overlapping periods of time that event instances of the two retrieved event identifiers were co-occurring, hence exceeding the threshold as discussed in FIG. 2. In embodiments, this co-occurring can determined that there may be a relationship between the two event types. In embodiments, the co-occurring may not be continuous. In embodiments, this determining can be accomplished for any two events from the history archives that are co-occurring and labeled as state detectors. In embodiments, once operation 302 has determined the co-occurrences of two state detector event types, the method can proceed to an operation 303.

In embodiments, operation 303 can include dividing the overlapping period of time by either first period of time that the first event identifier or the second event identifier was being recorded. As discussed in reference to FIG. 2, operation 206, this can result in the relationship between the two event types being scored. In embodiments, once operation 303 determines a score between the two event types, the method 300 can proceed to an operation 304.

In embodiments, operation 304 can include determining that the resultant score found in operation 303 is higher than a defined threshold. The resultant score being higher than a defined threshold can infer a correlation between event identifiers. The correlation between the two event types can be recorded for future use in a live setting. The correlation can be applied to events as they are occurring in "real time". Applying the correlation rules to events that are occurring in real time can affect the grouping of events, hence reduce workload for central operators that are handling the events.

A modified technique for determining a score can be used that takes into account "issue overlap time" between events that are both "State Detectors". For example, this issue overlap time can be used to account for a false positive. For each pair of event identifiers, extra information can be used to work out the contiguous overlapping portions of time that the event was alarming. The scoring the relationship can be measured as the period of time of co-occurrence divided by the period of time of either state event type being detected. The period of time of co-occurrence may be the period of overlap during which event instances of both event identifiers in a pair are being detected. Time can be treated as a continuous segment and not an occurrence count which benefits rule mining. This can be a more in-depth description of the time in which an event is co-alarming, since it is possible to run at a lower first occurrence threshold and yet be as sure of quality due to the knowledge that this was a state detector event. Once operation 304 has scored the relationship and determined that a correlation between two event identifiers exists, the method 300 can conclude.

Figure 4:
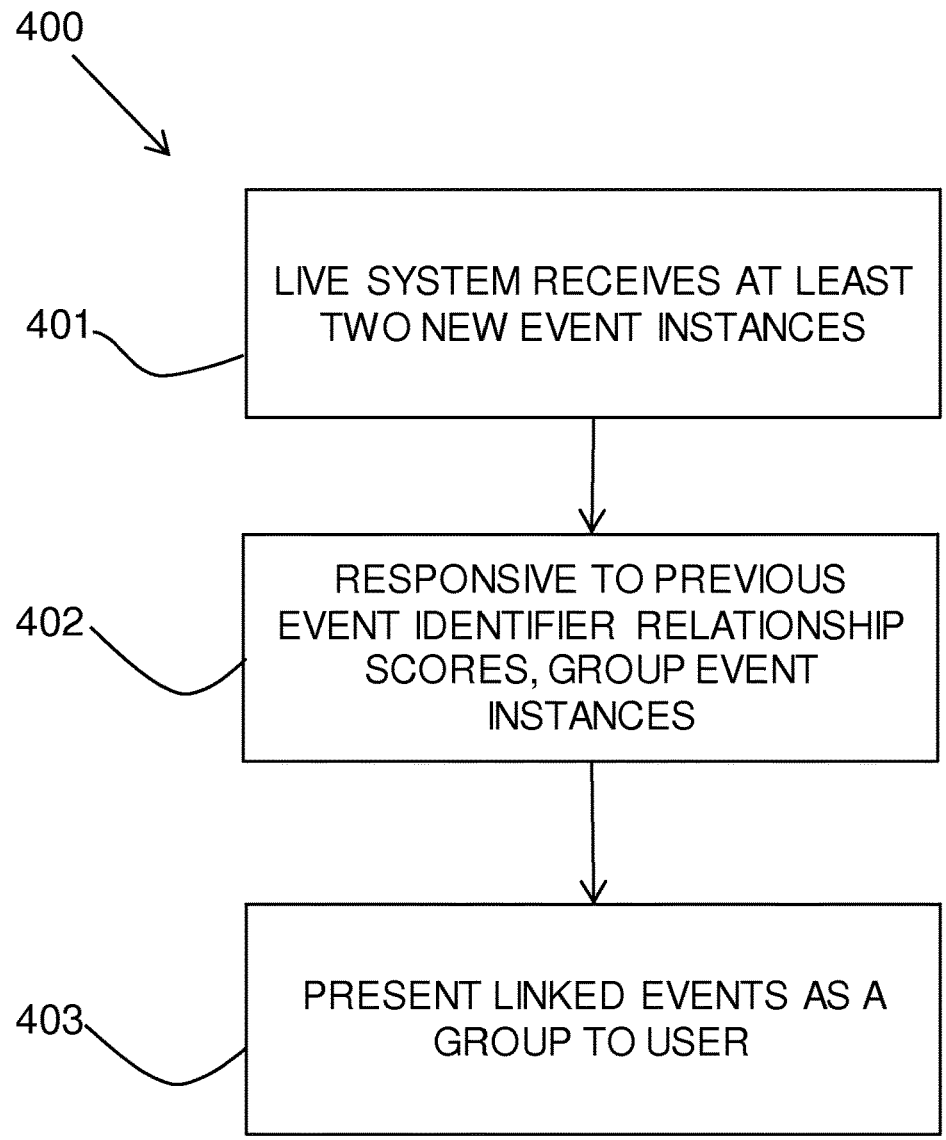
FIG. 4 depicts a flowchart for a method of grouping live event instances as they are received by a management system, according to various embodiments.

Now referring to FIG. 4, in embodiments, a flowchart for a method 400 shows an example embodiment of an aspect of the described method carried out in a live event management system. In embodiments, operation 401 can include a live event management system receiving at least two live events. In some cases, these two live events can be due to two databases failing at a first and a second host. In some cases, these two live events can be due to a system error at one or more hosts. The two event types can be determined to be state detectors or edge detectors. In embodiments, the method 200 and the method 300 could have already been previously performed on the two event types. In some cases, correlation rules may already exist for the two event types, so that the two event types could be grouped accordingly. In embodiments, once the operation 401 has received the two live events, the method 400 can proceed to an operation 402.

In embodiments, operation 402 can include applying the correlation rules to the two live events based on previous event groupings from the method of FIG. 2 and the learnt event types. Operation can further include deciding if the events are statistically linked, and if so group them for presentation 403 to the end user.

An example of the described method of determining an event type can be described. Each event is identified uniquely, in many cases, by its identifier (or a combination of attributes) across time. From this a series of timestamps can be seen which can represent a first occurrence, a repeated observation, or a resolution of the event. Each identifier can also be attributed to a specific event type. This is a many-to-one operation, in that there may be many events from different parts of the infrastructure with different identifiers but the same event type. The system receiving the events may not have control over what produces the event in many cases, as they can be custom written. This means it is not necessarily known if an event is a state detector or an edge detector event type. In an example embodiment, there may be access to a replay. In order to determine when an event is a state detector or an edge detector based on historical observations, the following method may be carried out.

A map of each event type may be built on the historical data of an identifier and the times associated with that identifier. For example, the times can begin when the event occurs, how long the event occurs for, and the final. For each event type, there is then an event type map that can determine the source of the event, as well as the associated times of the event. State detectors can report state at fixed time intervals during an occurrence of an event (e.g., the state at zero min (when the edge detector is recorded), the state at two min, the state at three min, etc. These fixed time intervals can be short in comparison to how often the state may trigger. The system may not be expected to be given a state of an event very frequently, for example, in the order of minutes. State detector's time between different problems will in general be large compared to the time intervals between report polling. If a problem is resolved, the state may not be seen again or for a period of the order of days. However, if a problem is not satisfactorily fixed, the polling may return.

Edge detectors on the other hand can report at the start of a problem. In some events, the problem can be intermittent and this edge can be triggered multiple times in close succession during one problem period, which may be referred to as "flapping" which should not frequently occur. However, the time between reports can, in general, be sporadic and not regular. Disclosed is a method to determine event relationships by the inference of edge events versus state events. This can help to group events to prevent flooding of an event monitoring system, thus reducing workload for control operators. Prior event history can be mined for patterns, and the cadence of current events against the mined patterns can determine an event categorization. The method can determine events that are both state detectors, the method uses modified criteria that takes into account "issue overlap time".

Figure 5:
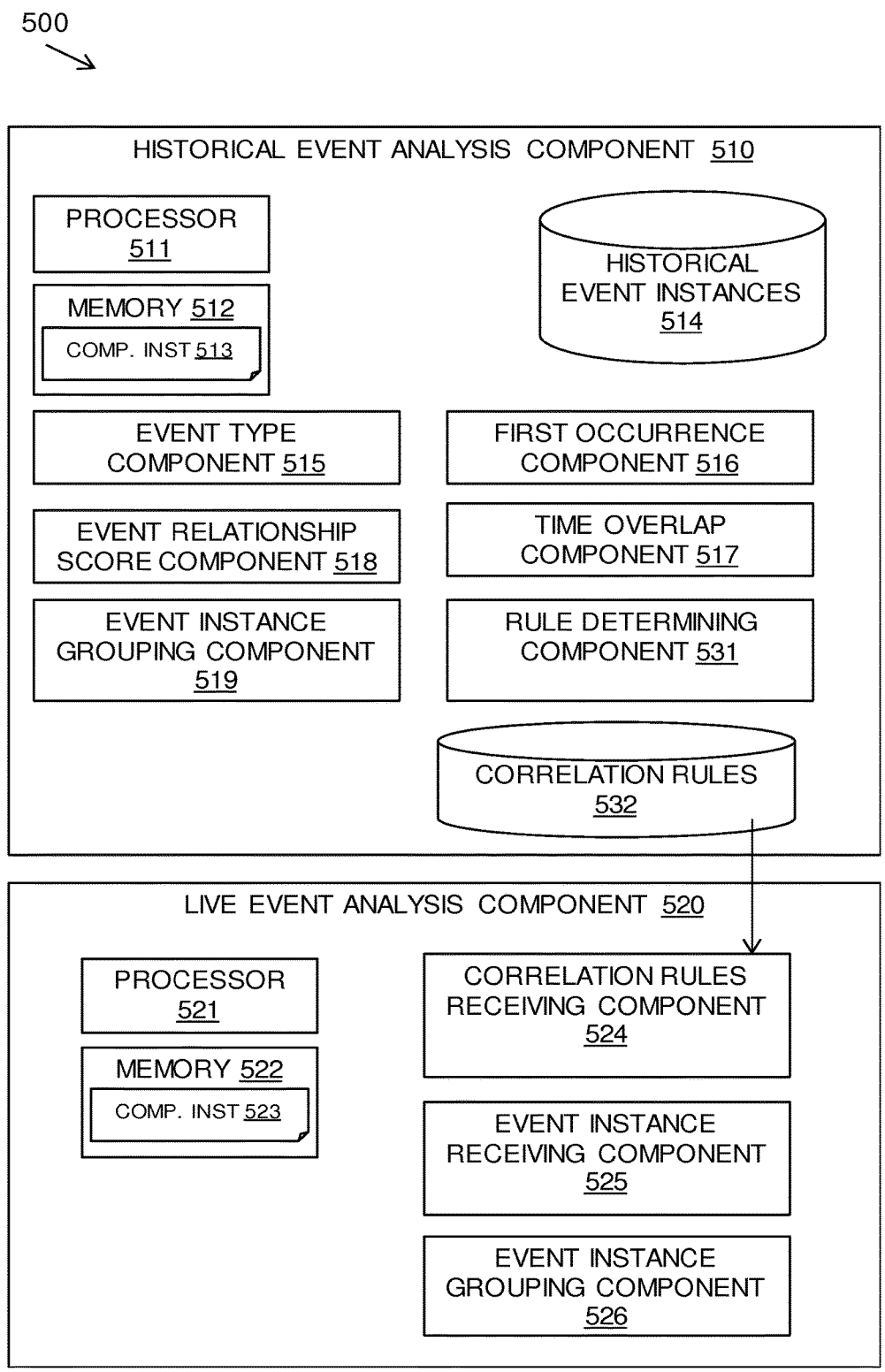
FIG. 5 depicts block diagram of an example embodiment of a system in accordance with the present disclosure, according to various embodiments.

Referring to FIG. 5, a block diagram 500 showing an event management system can be seen, according to various embodiments. The block diagram 500 can include a historical event analysis component 510. The historical event analysis component 500 can include a list of events that comprises an event identifier and a type of state for the given detector. In embodiments, the block system can include a live event analysis component 520. The historical event analysis component 510 and the live event analysis component 520 may each include at least one processor 511, 521, a hardware module, or a circuit for executing the functions of the described components. The components may be software units executing on the at least one processors 511, 521. Multiple processors running parallel processing threads may be provided enabling parallel processing of some or all of the functions of the components. Memory 512, 522 may be configured to provide computer instructions 513, 523 to the at least one processor 511, 521 to carry out the functionality of the components.

The historical event analysis component 510 and the live event analysis component 520 may be provided at the same location or may be remote to each other, e.g., connectively or communicatively coupled, respectively. For example, a live event analysis component 520 may be provided at an environment being monitored, whilst the historical event analysis component 510 may be provided remotely. The historical event analysis component 510 may include or have access to a list of historical event instances 514 on which analysis can be carried out. The historical event analysis component 510 may include an event type component 515 for determining an event type of an event identifier in the store of historical event instances 514. This may determine if an event identifier is a state detector event type or an edge detector event type.

The historical event analysis component 510 may include a first occurrence component 516 for carrying out the described first occurrence technique for two event identifiers which are both edge detector event types or one event type is an edge detector event type and the other is a state detector event type. The historical event analysis component 510 may include a time overlap component 517 for carrying out an issue overlap technique for two event identifiers which are both state detector event types. The historical event analysis component 510 may include an event relationship score component 518 for determining a score for a pair of event identifiers using either the first occurrence component 516 or the time overlap component 517.

The historical event analysis component 510 may include an event instance grouping component 519 for grouping event instances of event identifiers which have a relationship score that could have exceeded a threshold, e.g., a correlation exists between the two event types. The historical event analysis component 510 may include a rule determining component 531 for generating correlation rules based on the event relationship scores being correlated. The generated correlation rules 532 may be stored, monitored, and made available to the live event analysis component 520.

The live event analysis component 520 may include a correlation rules receiving or accessing component 524 for accessing the correlation rules generated by the historical event analysis component 510. The live event analysis component 520 may include an event instance receiving component 525 for receiving live event instances and an event instance grouping component 526 may group the event instances by applying the correlation rules. The grouped events may be displayed to a user.

An example can be included in order to further explain aspects of the present disclosure. In some embodiments, a computer-implemented method for event grouping in network management event streams may include providing a history of event instances with each event instance having an event identifier and a timestamp; identifying, by detecting regular intervals of event instances, a first event identifier of a first event instance and a second event identifier of a second event instance that have state event types; scoring, based on a time period of overlap of the first event identifier and the second state identifier that are identified as the same event types, a relationship between the two event identifiers; scoring, based on a first occurrence of each of the two event identifiers that are not both identified as the same state event types, a relationship between the two event identifiers; and grouping, based on using the relationship scores between the two event identifiers, the event instances.

In some embodiments, scoring a relationship between the two event identifiers based on a time period of overlap of the event instances belonging to the two event identifiers includes determining a period of time of co-occurrence of event instances belonging to the two event identifiers divided by a period of time either the first event identifier or the second event identifier is occurring. In some embodiments, scoring a relationship between the two event identifiers based on a first occurrence of an event instance of each of the two event identifiers includes determining a count of co-occurrences of a first event identifier and a second event identifier divided by a maximum of the count of occurrences of the first event identifier and the count of occurrences of the second event identifier.

In some embodiments, the method can further include determining correlation rules based on the relationship scores and the grouped event instances and applying the correlation rules to live event instances to group the live event instances. In some embodiments, using the relationship scores between two event identifiers to group event instances includes determining if a relationship score is above a pre-defined threshold. The method can also include an event identifier being provided by one or more attributes in an event instance. In some embodiments, identifying event identifiers that are state event types by detecting regular intervals of event instances with an event identifier in the history includes providing raw replay event data and build a map of event identifier and timestamps and determining the differences between the timestamps. In some embodiments, identifying event identifiers that are state event types by detecting regular intervals of event instances with an event identifier in the history includes providing reporter schema event data and determining a spread of tallies for the event data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
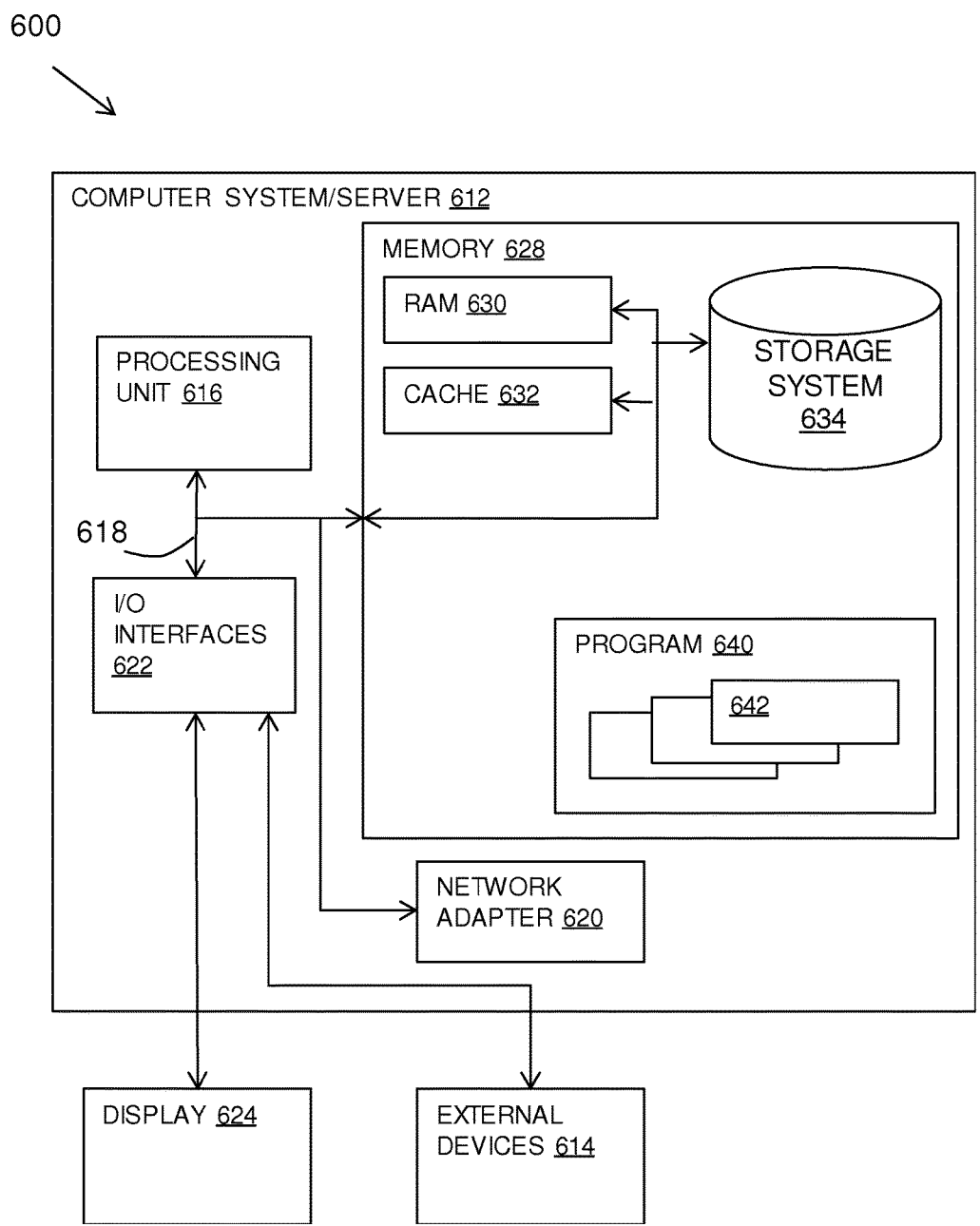
FIG. 6 depicts a block diagram of an embodiment of a computer system or cloud server in which the present disclosure may be implemented, according to various embodiments.

Referring now to FIG. 6, a schematic of an example of computer system or server is shown which may be implemented as a cloud computing node 600.

Cloud computing node 600 is only one example of a suitable cloud computing node and is not intended to suggest any limitation as to the scope of use or functionality of embodiments of the invention described herein. Regardless, cloud computing node 600 is capable of being implemented and/or performing any of the functionality set forth hereinabove.

In cloud computing node 600 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 600 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
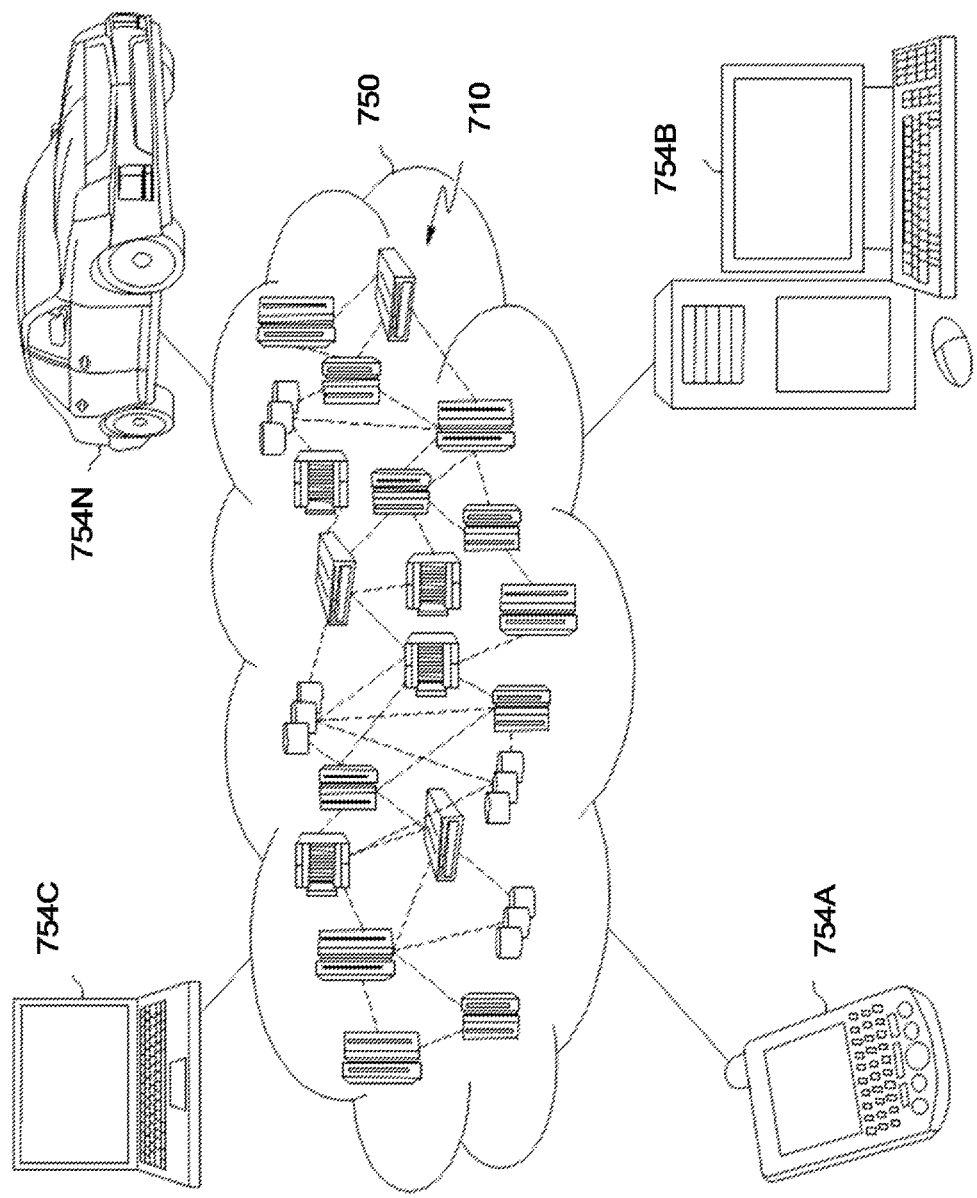
FIG. 7 depicts a schematic diagram of a cloud computing environment in which the present invention may be implemented, according to various embodiments.

Referring now to FIG. 7, illustrative cloud computing environment 750 is depicted. As shown, cloud computing environment 750 comprises one or more cloud computing nodes 600 with which local computing devices used by cloud consumers, such as, for example, personal digital assistant (PDA) or cellular telephone 754A, desktop computer 754B, laptop computer 754C, and/or automobile computer system 754N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 600 and cloud computing environment 750 can communicate with any type of computerized device over any type of network and/or network addressable connection (e.g., using a web browser).

Figure 8:
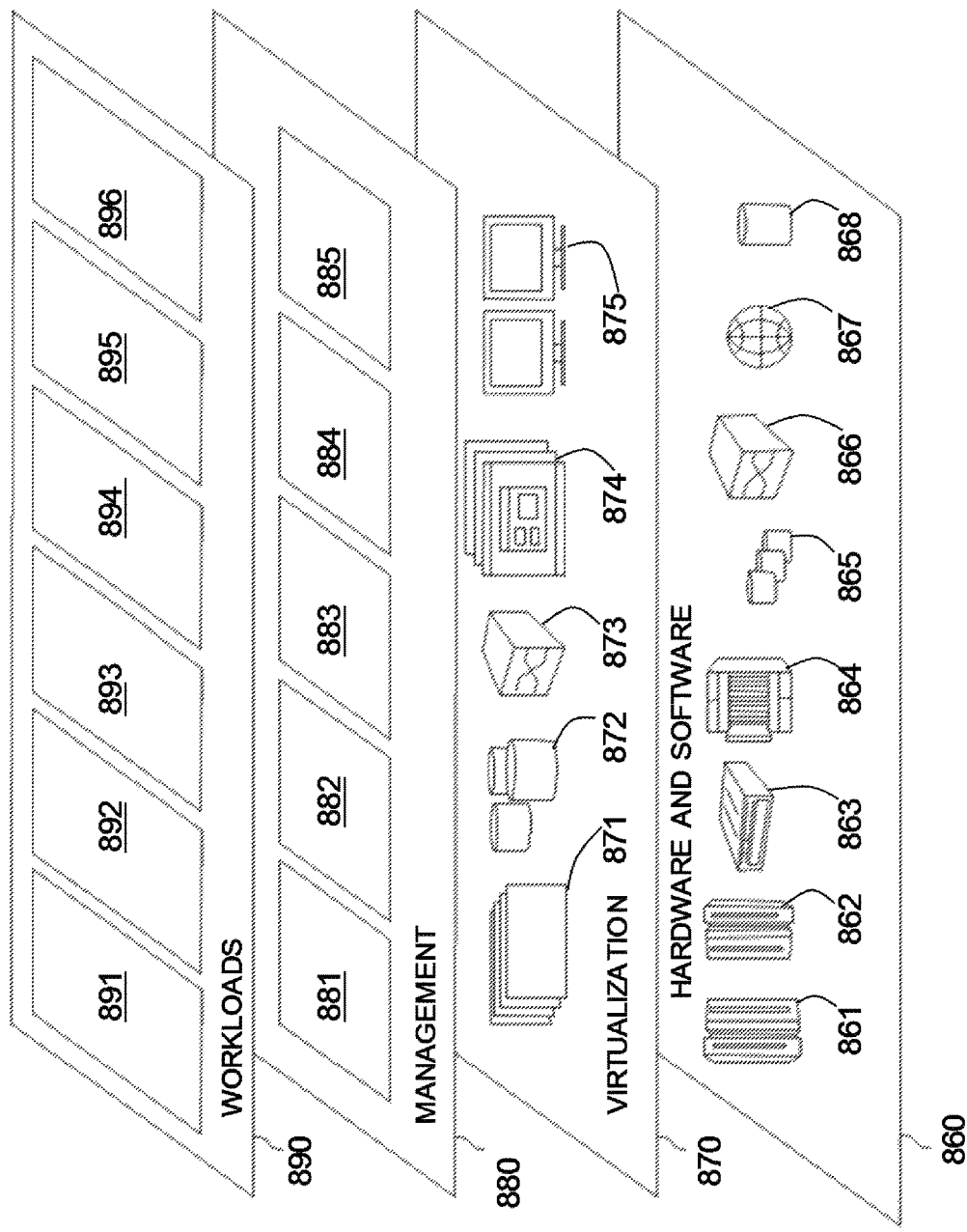
FIG. 8 depicts a diagram of abstraction model layers of a cloud computing environment in which the present disclosure may be implemented, according to various embodiments.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; and event processing 895 including as described herein; and other functionality 896 as required.

Improvements and modifications can be made to the foregoing without departing from the scope of the present invention.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for event grouping in network management event streams comprising:
   receiving, based on a first event occurring and a second event occurring, a plurality of first event instances of the first event and a plurality of second event instances of the second event instance having an event identifier and a timestamp;
   identifying, in response to the receiving, a first event type of the plurality of first event instances and a second event type of the plurality of second event instances;
   determining, by detecting regular intervals between the plurality of first event instances, as compared to each other, and the plurality of second event instances, as compared to each other, a time period of overlap between the first event and the second event;
   scoring, based on the time period of overlap, a relationship between the first event and the second event;
   wherein scoring the relationship is based on a count of co-occurrences of the received event instances divided by a first maximum count of the plurality of first event instances and a second maximum count of the plurality of second event instances; and
   grouping, based on the scored relationship, the first event and the second event.

2. The method of claim 1, wherein the plurality of first event instances and the plurality of second event instances have similar event identifiers.

3. The method of claim 1, wherein the scoring the relationship is based on a period of time of co-occurrence of receiving both of the first plurality and the second plurality of event instances simultaneously divided by a period of time that the plurality of first event instance are received and the plurality of second event instances are received.

4. The method of claim 1, the method further comprising:
   determining, based on the scoring the relationship, that the relationship exceeds a threshold, wherein the events are grouped together in response to the determining that the relationship exceeds a threshold.

5. The method of claim 4, the method further comprising:
   recording, based on events exceeding a threshold, the events to a historical archive.

6. The method of claim 4, the method further comprising:
   determining, based on the scored relationship exceeding a threshold, correlation rules;
   applying, in response to the determining, the correlation rules to live event instances; and
   grouping, in response to the applying the correlation rules, the live event instances.

7. The method of claim 1, wherein the identifying the event instances further includes:
   recording the plurality of first event instances and the plurality of second event instances to a historical archive of event instances that includes event identifiers and timestamps for each event instance; and
   determining, based on the historical archive, a difference between one or more timestamps that are associated with each of the event instances.

8. An event management system for event grouping in network management event streams, comprising:
   a processor and a memory configured to provide computer program instructions to the processor to execute functions of defined components;
   a store of a history of event instances that correspond to technical errors regarding a computer network, with each event instance having an event identifier and a timestamp;
   an event type component for identifying event identifiers that are state event types by detecting regular intervals of event instances with an event identifier in the history;
   a time overlap component for, between two event identifiers that are identified as state event types, scoring a relationship between the two event identifiers that are identified as state event types based on a time period of overlap of the event instances belonging to the two event identifiers that are identified as state event types;
   wherein the time overlap component is further configured for determining a period of time of co-occurrence of event instances belonging to the two event identifiers that are identified as state event types divided by a period of time either a first event identifier or a second event identifier is occurring;
   a first occurrence component for, between two event identifiers that are not both identified as state event types, scoring a relationship between the two event identifiers that are not both identified as state event types based on a first occurrence of an event instance of each of the two event identifiers that are not both identified as state event types; and
   an event instance grouping component for using relationship scores between two event identifiers to group event instances in a network management event stream.

9. The system as claimed in claim 8, wherein the first occurrence component is further configured for:
   determining a count of co-occurrences of a first event identifier and a second event identifier divided by a maximum of the count of occurrences of the first event identifier and the count of occurrences of the second event identifier.

10. The system as claimed in claim 8, including:
    a rule determining component for determining correlation rules based on relationship scores and grouped event instances.

11. The system as claimed in claim 10, including:
    a live event analysis component including an event grouping component for applying the correlation rules to live event instances to group the live event instances.

12. The system as claimed in claim 8, wherein the event instance grouping component is further configured for determining if a relationship score is above a pre-defined threshold.

13. The system as claimed in claim 8, wherein an event identifier is provided by one or more attributes in an event instance.

14. The system as claimed in claim 8, wherein the event type component is further configured for:
    providing raw replay event data and building a map of event identifiers and timestamps; and
    determining differences between the timestamps.

15. The system as claimed in claim 8, wherein the event type component is further configured for:
    providing reporter schema event data; and
    determining a spread of tallies for the reporter schema event data.

16. A computer program product for event grouping in network management event streams, the computer program product comprising a computer readable storage medium having program instructions embodied therewith, the program instructions executable by a processor to cause the processor to:

provide a history of event instances with each event instance having an event identifier and a timestamp;

identify event identifiers that are state event types by detecting regular intervals of event instances with an event identifier in the history;

between two event identifiers that are identified as state event types, score a relationship between the two event identifiers that are identified as state event types based on a time period of overlap of the event instances belonging to the two event identifiers that are identified as state event types;

wherein scoring a relationship between the two event identifiers that are identified as state event types based on a time period of overlap of the event instances belonging to the two event identifiers that are identified as state event types includes determining a period of time of co-occurrence of event instances belonging to the two event identifiers that are identified as state event types divided by a period of time either a first event identifier or a second event identifier is occurring;

between two event identifiers that are not both identified as state event types, score a relationship between the two event identifiers that are not both identified as state event types based on a first occurrence of an event instance of each of the two event identifiers that are not both identified as state event types; and use relationship scores between two event identifiers to group event instances.

17. The computer program product as claimed in claim 16, wherein scoring a relationship between the two event identifiers that are not both identified as state event types based on a first occurrence of an event instance of each of the two event identifiers that are not both identified as state event types includes:

determining a count of co-occurrences of a first event identifier and a second event identifier divided by a maximum of a count of occurrences of the first event identifier and a count of occurrences of the second event identifier.

* * * * *